United States Patent
Wood et al.

(10) Patent No.: US 9,906,374 B2
(45) Date of Patent: Feb. 27, 2018

(54) EFFICIENT CERTIFICATE REVOCATION LIST PROCESSING

(71) Applicant: Red Hat, Inc., Raleigh, NC (US)

(72) Inventors: Thomas A. Wood, Raleigh, NC (US);
Christopher L. Rog, Cary, NC (US);
Adrian K. Likins, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 170 days.

(21) Appl. No.: 15/056,371

(22) Filed: Feb. 29, 2016

(65) Prior Publication Data

US 2017/0250824 A1    Aug. 31, 2017

(51) Int. Cl.
*H04L 29/06* (2006.01)
*H04L 9/32* (2006.01)

(52) U.S. Cl.
CPC .......... *H04L 9/3268* (2013.01); *H04L 9/3247* (2013.01)

(58) Field of Classification Search
CPC ... H04L 9/3247; H04L 9/3268; H04L 9/3263; H04L 2209/30; H04N 21/2585; G06F 21/33
USPC ........................................................ 713/158
See application file for complete search history.

(56) References Cited

U.S. PATENT DOCUMENTS

| | | | |
|---|---|---|---|
| 7,124,295 B1 * | 10/2006 | Zhao | H04L 63/0823 713/156 |
| 7,761,467 B2 | 7/2010 | Xu et al. | |
| 8,458,457 B2 | 6/2013 | Parkinson | |
| 8,464,045 B2 | 6/2013 | Hendsbee et al. | |
| 8,700,903 B2 | 4/2014 | Hsueh et al. | |
| 9,003,110 B2 | 4/2015 | Amit et al. | |
| 9,054,879 B2 | 6/2015 | Medvinsky et al. | |
| 2008/0034204 A1 * | 2/2008 | Lakshminarayanan | H04L 63/0823 713/158 |
| 2008/0126378 A1 * | 5/2008 | Parkinson | G06F 21/33 |

OTHER PUBLICATIONS

Author Unknown, "Class Certificate Factory," Certificate Factory, Java Platform SE 7, Date Accessed: Dec. 21, 2015, 9 pages, https://docs.oracle.com/javase/7/docs/api/java/security/cert/CertificateFactory.html.

(Continued)

*Primary Examiner* — Yogesh Paliwal
(74) *Attorney, Agent, or Firm* — Withrow & Terranova, PLLC (57) ABSTRACT

Efficient certificate revocation list (CRL) processing is disclosed. A desired modification to an encoded CRL is determined. A computing device sequentially processes, during a first pass, a first CRL stream comprising the CRL to identify a CRL length difference between the CRL and a modified CRL based on the desired modification. The computing device sequentially processes, during a second pass, a second CRL stream comprising the CRL. The computing device, during the second pass, streams a modified encoded header portion to a modified CRL stream that identifies a new length of the modified CRL based on the length difference, streams a modified encoded CRL entries portion comprising a plurality of CRL entries to the modified CRL stream that contains the desired modification, and streams a modified encoded trailer portion to the modified CRL stream that contains a new digital signature based on the desired modification.

19 Claims, 5 Drawing Sheets

(56) References Cited

OTHER PUBLICATIONS

Author Unknown, "Object Streams," The Java™ Tutorials > Essential Classes > Basic I/O, Date Accessed: Dec. 21, 2015, 2 pages, https://docs.oracle.com/javase/tutorial/essential/io/objectstreams.html.
Cooper, D. et al., "RFC 5280—Internet X.509 Public Key Infrastructure Certificate and Certificate Revocation List (CRL) Profile," RFC 5280, Standards Track, May 2008, 152 pages, https://tools.ietf.org/html/rfc5280.
Debnath, Manoj, "File Handling in Java: Object Serialization," developer.com, Jan. 14, 2015, 7 pages, http://www.developer.com/java/data/file-handling-in-java-object-serialization.html.
Scheibelhofer, Karl, "Parsing Large CRLs in Java," Stiftung SIC, Jun. 2006, 3 pages, http://jcewww.iaik.tu-graz.ac.at/index.php/sic/Support/Technical_Articles/Parsing_Large_CRLs_in_Java.
Scheibelhofer, Karl, "Parsing Large CRLs in Java," Stiftung SIC, Jun. 2006, 4 pages, http://jcewww.iaik.tu-graz.ac.at/index.php/sic/Support/Technical_Articles/Parsing_Large_CRLs_in_Java.

\* cited by examiner

EFFICIENT CERTIFICATE REVOCATION LIST PROCESSING

TECHNICAL FIELD

The examples relate generally to secure transaction processing and, in particular, to efficient processing of a certificate revocation list.

BACKGROUND

A public key certificate (hereinafter "certificate") authenticates a public key used in a secure encrypted transaction that utilizes a public key and private key pair. Prior to engaging in a secure transaction that uses the public key, it is important to ensure that the certificate authority that issued the certificate has not revoked the certificate. To facilitate this determination, certificate authorities periodically issue certificate revocation lists (CRLs) that identify revoked certificates.

A CRL is a data structure that includes a CRL entry for each revoked certificate. A CRL also contains a digital signature that can be used to authenticate the CRL. A CRL is encoded in accordance with a particular format such as Abstract Syntax Notation One (ASN.1). A CRL may contain thousands or even millions of CRL entries. Typically a CRL is processed by reading the CRL and building an in-memory data structure that includes each CRL entry. Once built, the in-memory data structure can be rapidly searched to determine whether a certificate has been revoked. However, the generation of the in-memory structure may utilize relatively large amounts of memory, reducing the memory available to other processes, and decoding thousands or millions of CRL entries may take a relatively long period of time, resulting in unacceptable processing delays.

Modifying a CRL by a certificate authority may be equally or even more time-consuming than reading the CRL, since any change to the CRL requires that the entire CRL be processed by a signature algorithm to generate the digital signature that is used to authenticate the CRL.

SUMMARY

The examples include methods, computing devices, and non-transitory computer-readable storage mediums for efficient processing of a certificate revocation list (CRL). The examples utilize substantially less memory and processor resources than conventional mechanisms for processing a CRL by, in part, eliminating a need to load all the CRL entries into memory and build an in-memory CRL structure in order to read or modify a CRL.

In one example, a method for modifying a certificate revocation list (CRL) is provided. The method includes determining a desired modification to a CRL encoded in an encoding format. The CRL comprises an encoded header portion, an encoded CRL entries portion, and an encoded trailer portion. The method further includes sequentially processing, by a computing device comprising a processor device, during a first pass, a first CRL stream comprising the CRL to identify a CRL length difference between the CRL and a modified CRL based on the desired modification. The method further includes sequentially processing, by the computing device, during a second pass, a second CRL stream comprising the CRL. The method further includes, during the second pass, streaming a modified encoded header portion to a modified CRL stream that identifies a new length of the modified CRL based on the CRL length difference, streaming a modified encoded CRL entries portion comprising a plurality of CRL entries to the modified CRL stream that contains the desired modification, and streaming a modified encoded trailer portion to the modified CRL stream that contains a new digital signature based on the desired modification.

In another example, a computing device is provided. The computing device includes a memory and a processor device coupled to the memory. The processor device is to determine a desired modification to a CRL encoded in an encoding format. The CRL comprises an encoded header portion, an encoded CRL entries portion, and an encoded trailer portion. The processor device is further to sequentially process, during a first pass, a first CRL stream comprising the CRL to identify a CRL length difference between the CRL and a modified CRL based on the desired modification. The processor device is further to sequentially process, during a second pass, a second CRL stream comprising the CRL. The processor device is further to, during the second pass, stream a modified encoded header portion to a modified CRL stream that identifies a new length of the modified CRL based on the CRL length difference, stream a modified encoded CRL entries portion comprising a plurality of CRL entries to the modified CRL stream that contains the desired modification, and stream a modified encoded trailer portion to the modified CRL stream that contains a new digital signature based on the desired modification.

In another example, a computer program product for modifying a CRL is provided. The computer program product is stored on a non-transitory computer-readable storage medium and includes instructions configured to cause a processor device to carry out the step of determining a desired modification to a CRL encoded in an encoding format. The CRL comprises an encoded header portion, an encoded CRL entries portion, and an encoded trailer portion. The instructions are also configured to cause the processor device to carry out the step of sequentially processing during a first pass, a first CRL stream comprising the CRL to identify a CRL length difference between the CRL and a modified CRL based on the desired modification. The instructions are also configured to cause the processor device to carry out the step of sequentially processing during a second pass, a second CRL stream comprising the CRL. The instructions are also configured to cause the processor device to carry out the steps of streaming a modified encoded header portion to a modified CRL stream that identifies a new length of the modified CRL based on the CRL length difference, streaming a modified encoded CRL entries portion comprising a plurality of CRL entries to the modified CRL stream that contains the desired modification, and streaming a modified encoded trailer portion to the modified CRL stream that contains a new digital signature based on the desired modification.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first stream" and "second stream," and does not imply a priority, a type, an importance, or other attribute, unless otherwise stated herein.

As used herein and in the claims, the articles "a" and "an" in reference to an element refer to "one or more" of the element unless otherwise explicitly specified.

The examples include methods, computing devices, and non-transitory computer-readable storage mediums for efficient processing of a certificate revocation list (CRL). The examples utilize substantially less memory and processor resources than conventional mechanisms for processing a CRL by, in part, eliminating a need to load CRL entries into memory and build an in-memory CRL structure in order to read or modify a CRL. Among other advantages, the examples can reduce processing of a CRL from many minutes to less than one minute, allowing secure transactions to initiate more quickly than previously possible, and/or allowing a CRL to be modified more quickly than previously possible.

Cryptography is widely used in modern electronic communications for a variety of reasons, including security, privacy, or to guarantee authenticity. A popular form of cryptography involves the use of a paired public key and private key. An information recipient obtains a private key and a public key that are associated with one another such that information encrypted with the private key can only be decrypted with the public key, and vice versa. As can be inferred from the nomenclature, a public key is made publicly available and a private key is maintained in private. An information sender obtains the public key of the information recipient. The information sender encrypts the information with the public key of the information recipient, and sends the information to the information recipient. The information recipient receives the information and decrypts the information using the private key of the information recipient. Any other unintentional recipient of the information, including, for example, nefarious unintended recipients, cannot decrypt the message because such unintended recipients do not have the private key of the information recipient.

A public key infrastructure (PKI) exists to facilitate secure electronic communications. The PKI infrastructure includes certificate authorities who issue public key certificates (hereinafter "certificates" for purposes of brevity) that authenticate a public key submitted to the certificate authority by an information recipient. Among other information, a certificate typically includes the public key of a particular information recipient, identification information associated with the information recipient, a certificate identifier that uniquely identifies the certificate, a date after which the certificate is no longer valid, and information relating to the certificate authority.

Certificates may be revoked for a number of different reasons, including, for example, if the certificate authority has improperly issued a certificate, or if a private key is believed to have been compromised. Thus, prior to using a public key of an information recipient, the information sender typically ensures that the certificate associated with the information recipient is valid. This process is facilitated with the existence of certificate revocation lists (CRLs) that are issued periodically by a certificate authority that identifies all certificates that have been revoked by the certificate authority.

A CRL is a data structure that includes a CRL entry for each revoked certificate. A CRL also contains a digital signature that can be used to authenticate the CRL. A CRL is encoded in accordance with a particular format such as Abstract Syntax Notation One (ASN.1). A CRL may contain thousands or even millions of CRL entries. Typically a CRL is read and an in-memory structure is first generated that includes each CRL entry. Once built, the in-memory structure can be rapidly searched to determine whether a certificate has been revoked. However, the generation of the in-memory structure may utilize relatively large amounts of memory, reducing the memory available to other processes, and decoding thousands or millions of CRL entries may take a relatively long period of time, resulting in unacceptable processing delays.

Modifying a CRL by a certificate authority may be equally or more time-consuming since any change to the CRL requires that the entire CRL be processed by an algorithm to generate the digital signature that is used to authenticate the CRL, and each decoded CRL entry maintained in memory must be re-encoded into the encoding format prior to insertion of the CRL entry into the modified CRL.

Figure 1:
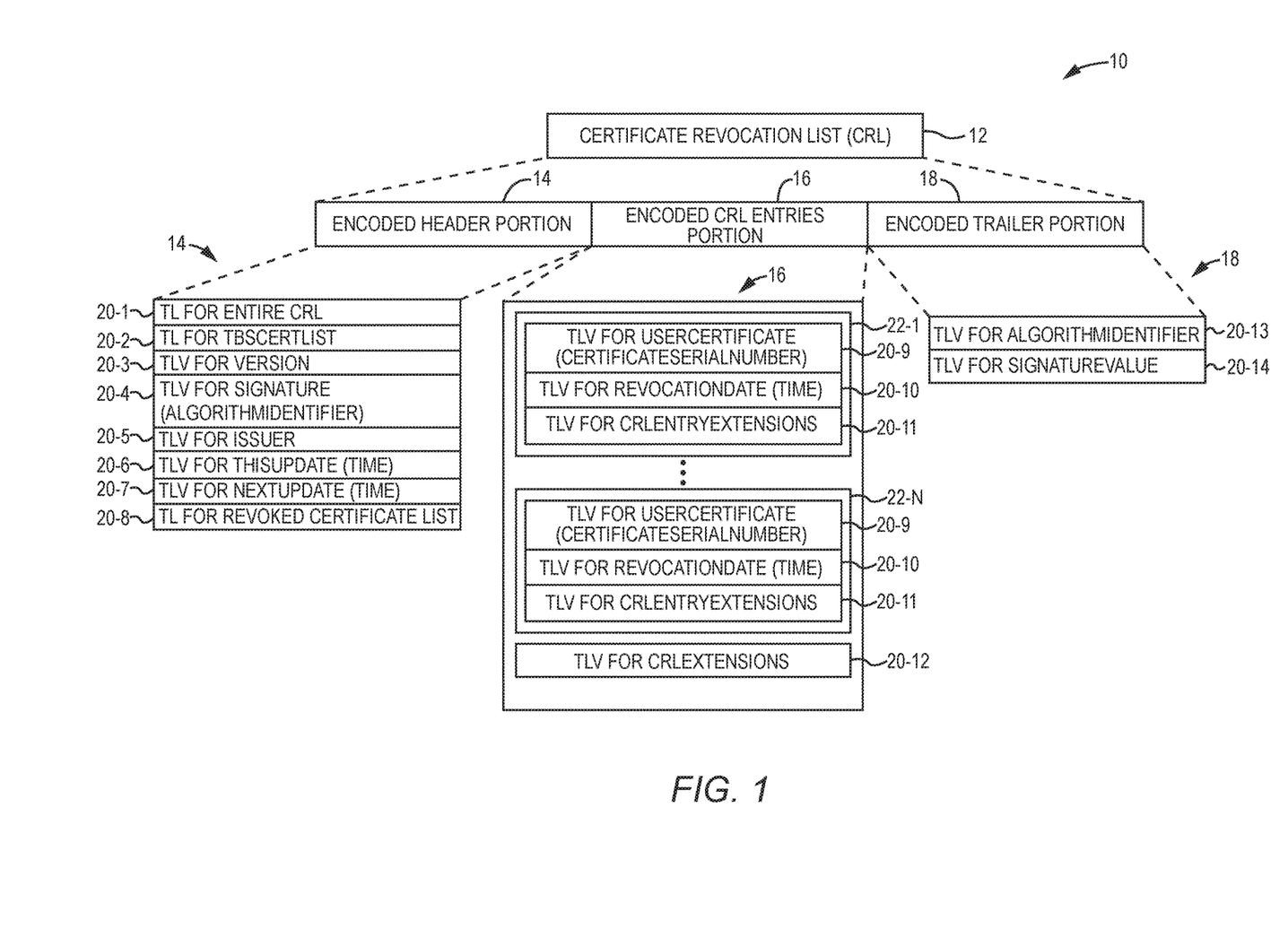
FIG. 1 is a block diagram illustrating a layout of a certificate revocation list (CRL) according to one example.

FIG. 1 is a block diagram illustrating a layout 10 of a CRL 12 according to one example. The CRL 12 has an encoded header portion 14, an encoded CRL entries portion 16, and an encoded trailer portion 18. In some examples, the CRL 12 comports with the Internet X.509 Public Key Infrastructure Certificate and CRL Profile.

The CRL 12 is encoded in an encoding format. In the examples discussed herein, the encoding format is the ASN.1 format. More specifically, the encoding format is the Distinguished Encoding Rules (DER) ASN.1 format; however, the examples are not limited to any particular encoding format. In the DER ASN.1 encoding format, each data element is encoded as a type identifier (T), sometimes referred to herein synonymously as a tag, that identifies a type of the data element, a length description (L) that identifies the length of the data element in octets, and the data element (V). This may be referred to as type-length-value (TLV) encoding. The tag information typically comprises one octet of information that identifies the type of the data element. The length description (L) typically comprises one octet of information if the length of the data element is 127 octets or fewer, and more than one octet if the length of the data element is greater than 127 octets. The data element (V) comprises the relevant data that is to be encoded.

The encoded header portion 14 includes TL data 20-1 that includes the tag and overall length of the CRL 12. TL data 20-2 is the value portion of the data 20-1 and includes the tag and length of a structure referred to as the "TBSCERTLIST," which, as will be discussed herein, essentially comprises the list of revoked certificates and information related to the revoked certificates. TLV data 20-3-20-12 is the value portion of the TL data 20-2. TLV data 20-3 includes the tag, value, and data element that identifies a version of the CRL 12. TLV data 20-4 includes the tag, length, and value of a signature algorithm used to generate a digital signature used to authenticate the CRL 12. TLV data 20-5 includes the tag, length, and value of the certificate authority that issued the CRL 12. TLV data 20-6 includes the tag, length, and value of the time of a current update of the CRL 12. TLV data 20-7 includes the tag, length, and value of the time of a next update of the CRL 12. TL data 20-8 includes the tag and length of the encoded CRL entries portion 16 of the CRL 12.

The encoded CRL entries portion 16 identifies the revoked certificates. The encoded CRL entries portion 16 includes a plurality of CRL entries 22-1-22-N (generally, CRL entries 22). The encoded CRL entries portion 16 may comprise any number of CRL entries 22 and, in some examples, may include millions of CRL entries 22. Each CRL entry 22 comprises TLV data 20-9 that includes the tag, length, and value of the certificate serial number that identifies the digital certificate that is revoked. TLV data 20-10 includes the tag, length, and value of the date that the certificate was revoked. TLV data 20-11 includes the tag, length, and value of any extensions for the certificate. The encoded CRL entries portion 16 also includes TLV data 20-12 that includes the tag, length, and value of any extensions associated with the encoded CRL entries portion 16. The TLV data 20-9-20-12 are the value portion of the TL data 20-8.

The encoded trailer portion 18 comprises TLV data 20-13 that includes a tag, length, and value of an algorithm identifier that identifies the algorithm used to generate the digital signature for the CRL 12. This information is typically identical to TLV data 20-4. The encoded trailer portion 18 also comprises TLV data 20-14 that includes a tag, length, and value of the digital signature of the CRL 12.

Figure 2:
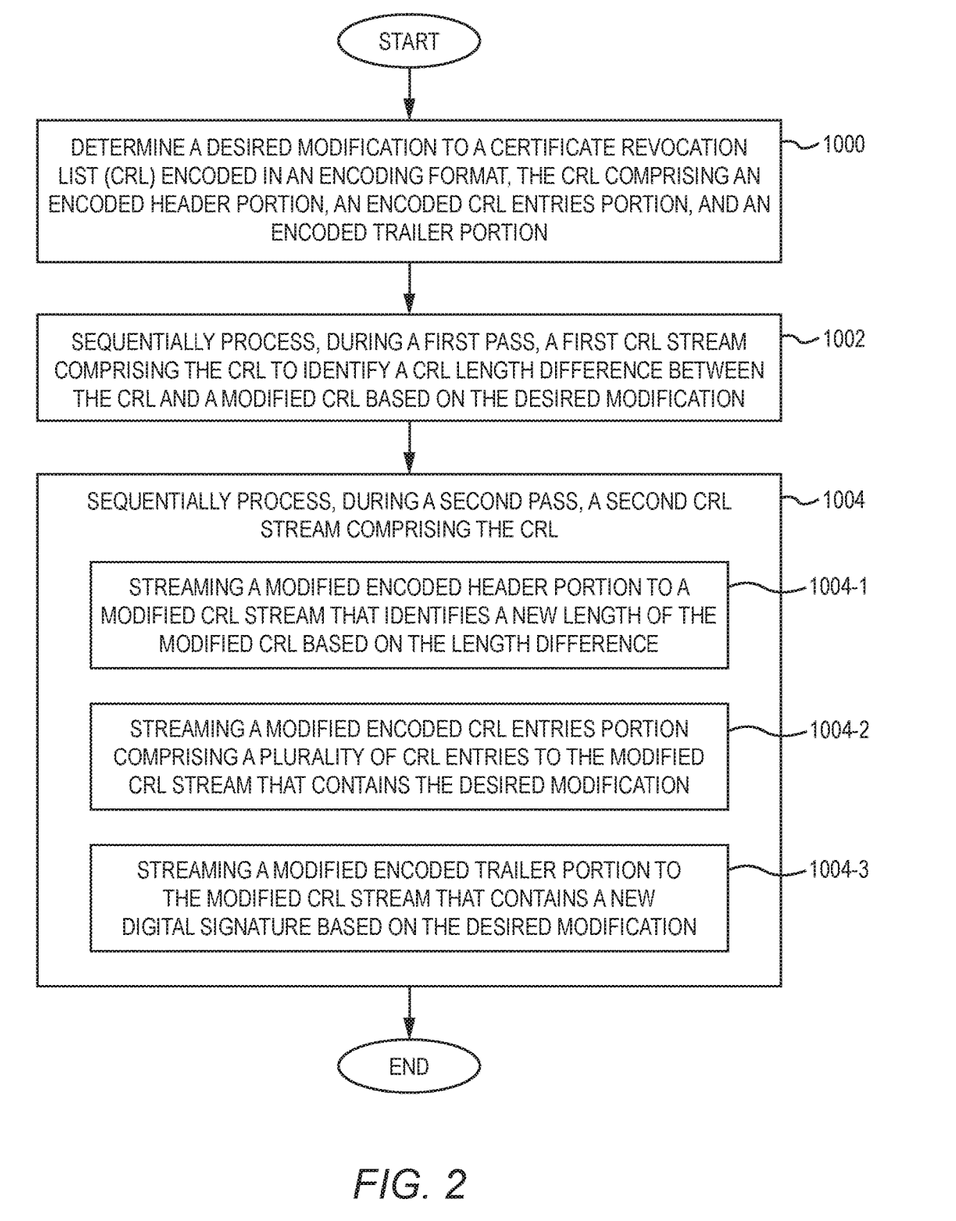
FIG. 2 is a flowchart of a method for efficient CRL processing according to one example.

FIG. 2 is a flowchart of a method for efficient CRL processing according to one example. FIG. 2 will be discussed in conjunction with FIG. 1. The method described herein may be implemented by a computing device that comprises a processor device and a memory. Functionality discussed herein, in some examples, may be implemented in part or in whole by the processor device. Because the processor device is part of the computing device, for purposes of illustration such functionality may be attributed herein to the computing device generally. The computing device determines a desired modification to the CRL 12 (FIG. 2, block 1000). The desired modification may comprise, for example, the deletion of one of more CRL entries 22, the addition of one or more new CRL entries 22, or a combination thereof. During a first pass, the computing device processes a first CRL stream comprising the CRL 12 to identify a CRL length difference between the CRL 12 and a modified CRL based on the desired modification (FIG. 2, block 1002). For example, if CRL entries 22 are being deleted from the CRL 12, then the modified CRL may be shorter than the CRL 12. If new CRL entries 22 are being added to the CRL 12, then the modified CRL may be longer than the CRL 12. If CRL entries 22 are being deleted and new CRL entries 22 are being added, then the length of the modified CRL may be shorter or may be longer than the CRL 12.

The computing device then processes a second CRL stream comprising the CRL 12 in a second pass (FIG. 2, block 1004). The computing device streams a modified encoded header portion to a modified CRL stream that identifies a new length of the modified CRL based on the length difference (FIG. 2, block 1004-1). The modified CRL stream may be directed to another process, or may be directed to a file in a storage device. The computing device streams a modified encoded CRL entries portion comprising a plurality of CRL entries 22 to the modified CRL stream that contains the desired modification (FIG. 2, block 1004-2). The computing device streams a modified encoded trailer portion to the modified CRL stream that contains a new digital signature based on the desired modification (FIG. 2, block 1004-3).

The examples, among other advantages, facilitate the modification of the CRL 12 without having to build an in-memory structure of each CRL entry 22. This greatly reduces memory requirements for modifying the CRL 12, and also eliminates the need to re-encode each CRL entry 22 in the encoding format of the CRL 12 in order to insert the CRL entries 22 into the modified CRL, thus reducing processing requirements.

Figure 3:
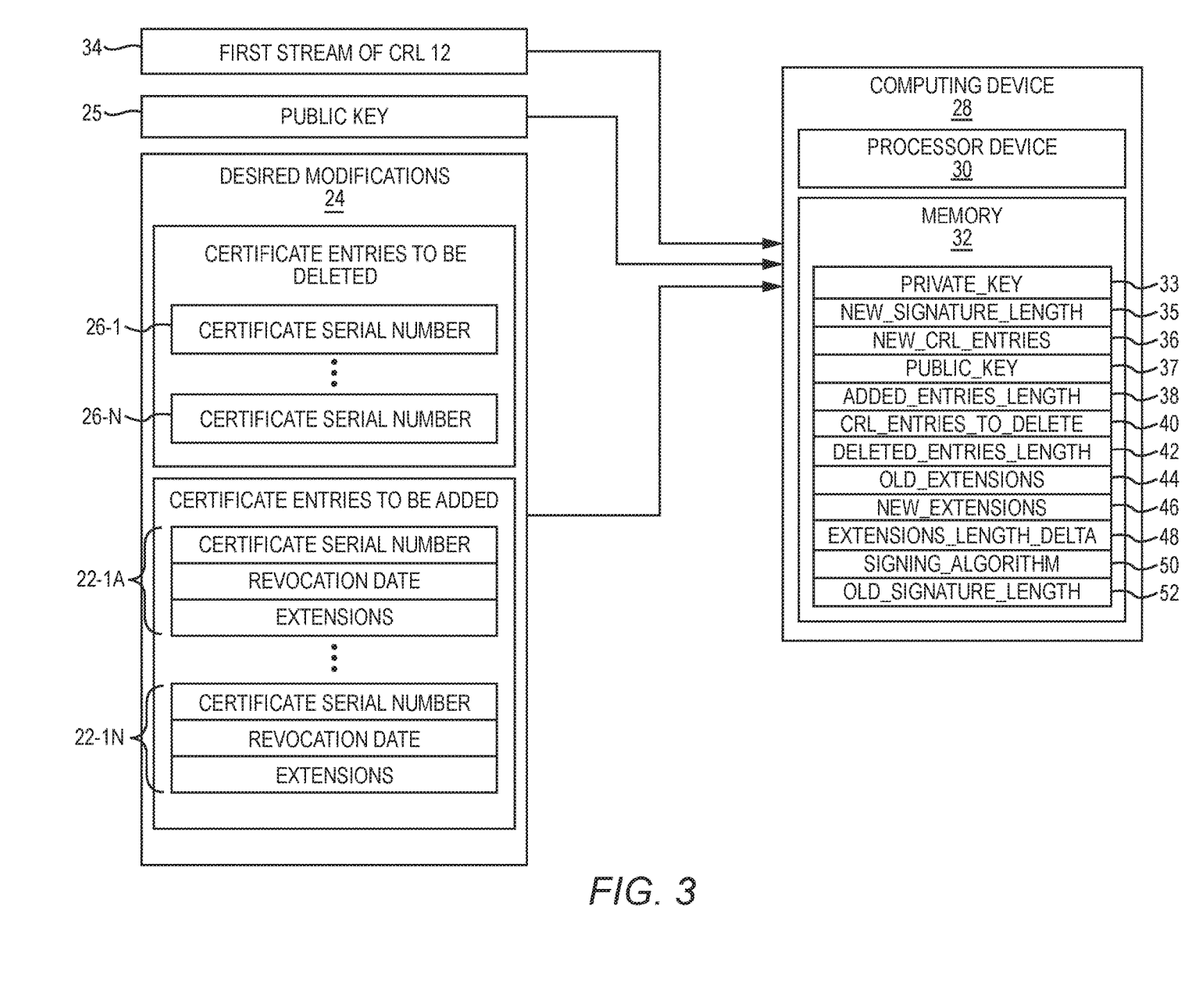
FIG. 3 is a block diagram illustrating aspects of a first pass through a CRL according to one example.

FIG. 3 is a block diagram illustrating aspects of the first pass through the CRL 12 as illustrated in block 1002 of FIG. 2 in greater detail according to one example. FIG. 3 will be discussed in conjunction with FIG. 1. Assume for purposes of illustration that desired modifications 24 to the CRL 12 include a plurality of CRL entries 22 to be removed from the CRL 12 and a plurality of new CRL entries 22-1A-22-1N to be added to the CRL 12. The CRL entries 22 to be removed are identified by certificate serial numbers 26-1-26-N. A computing device 28 receives the desired modifications 24. The computing device 28 includes a processor device 30 and memory 32. As discussed in greater detail below, the memory 32 is used to maintain a plurality of temporary storage locations to facilitate the modification of the CRL 12. The computing device 28 also receives a public key 25 that will be inserted into the modified CRL subsequently as described in greater detail below. The size of the digital signature that will be used to authenticate the modified CRL depends on the size of the private key used to generate the digital signature. It will be assumed that the computing device 28 receives, or has access to, an appropriate private key stored in a storage location PRIVATE_KEY 33, and that the digital signature is generated using an RSA encryption algorithm. The RSA encryption algorithm generates a digital signature that has a length of the private key's modulus. It will be appreciated that other encryption algorithms may generate digital signatures having a different length. The computing device 28 determines the length of the new digital signature and stores the length in a storage location NEW_SIGNATURE_LENGTH 35 in the memory 32. The computing device 28 stores the public key in a storage location PUBLIC_KEY 37 in the memory 32.

In one example, the desired modifications 24 may be stored in a file that is accessed by the computing device 28. In other examples, the computing device 28 may receive the desired modifications 24 from a user (not illustrated) via an interactive user interface. The computing device 28 encodes the new CRL entries 22-1A-22-1N in the encoding format, such as the DER ASN.1 encoding format, and stores the encoded CRL entries 22-1A-22-1N in a storage location NEW_CRL_ENTRIES 36 in the memory 32. The computing device 28 determines a total length in octets of NEW_CRL_ENTRIES 36 and stores the total length in a storage location ADDED_ENTRIES_LENGTH 38 in the memory 32. The storage location ADDED_ENTRIES_LENGTH 38 thus identifies a total length of all the encoded CRL entries 22-1A-22-1N to be added during the second pass. The computing device 28 stores the certificate serial numbers 26-1-26-N in a storage location CRL_ENTRIES_TO_DELETE 40 in the memory 32.

The computing device 28 begins processing a first CRL stream 34 that comprises the CRL 12 to be modified. The first CRL stream 34 may originate from a CRL file on a storage device, or may be provided to the computing device 28 by a downstream process. During the first pass, the computing device 28 reads the fields of the encoded header portion 14 in accordance with the TLV data 20-1-20-8 as discussed above with regard to FIG. 1 to locate the beginning of the encoded CRL entries portion 16 in the first CRL stream 34. In particular, the computing device 28, based on the format of the CRL 12 as discussed above with regard to FIG. 1, processes through the TLV data 20-1-20-8 until positioned at the beginning of the encoded CRL entries portion 16.

The computing device 28 then iteratively reads each CRL entry 22 in the first CRL stream 34. If, as in this example, the desired modifications identify CRL entries 22 to be deleted, the computing device 28 accesses the storage location CRL_ENTRIES_TO_DELETE 40 to determine if the certificate serial number of the current CRL entry 22 read from the first CRL stream 34 matches a certificate serial number 26 in the storage location CRL_ENTRIES_TO_DELETE 40 and is thus to be deleted. If so, the computing device 28 determines the length of the current CRL entry 22 and maintains a running aggregate of the length of CRL entries 22 to be deleted in a storage location DELETED_ENTRIES_LENGTH 42. In pseudo code, such operation may be described as:

DELETED_ENTRIES_LENGTH 42:=DELETED_ENTRIES_LENGTH 42+(total length of the current CRL entry 22)

While in this example the CRL entries 22 to be deleted were provided to the computing device 28 at the beginning of the process, in other examples, the particular CRL entries 22 to be deleted may be determined during this first pass as the computing device 28 processes each CRL entry 22. In particular, in a program module context, a first program module processing the CRL entries 22 as described herein may call or otherwise invoke a second program module and pass the second program module information, such as the certificate serial number, the revocation date, and the extensions associated with the CRL entry 22. The second program module may utilize predetermined criteria to determine whether the CRL entry 22 is to be deleted. For example, the second program module may determine whether the certificate identified by the CRL entry 22 has expired and, if the CRL entry 22 identifies a certificate that has expired, the second program module directs the first program module to delete the CRL entry 22 during the second pass through the CRL 12. The first program module may then add the certificate serial number of the CRL entry 22 to the storage location CRL_ENTRIES_TO_DELETE 40. Alternatively, the first program module may make these determinations without invoking a second program module. After the computing device 28 has processed each CRL entry 22 in the CRL 12, the storage location DELETED_ENTRIES_LENGTH 42 identifies the total number of octets of the CRL entries 22 that will be removed from the CRL 12.

After the computing device 28 has processed each CRL entry 22, the computing device 28 identifies and stores the TLV data 20-12 that identifies the CRL extensions in a storage location OLD_EXTENSIONS 44. The CRL extensions include a field referred to as "crlNumber" which is to be incremented each time the CRL 12 is modified. The computing device 28 increments the crlNumber field of the CRL extensions and stores the modified CRL extensions in a storage location NEW_EXTENSIONS 46 in the memory 32. The CRL extensions also include the public key 25 of the certificate authority that digitally signs the modified CRL. The computing device 28 inserts the public key 25 into the modified CRL extensions stored in the storage location NEW_EXTENSIONS 46. The computing device 28 then determines a CRL extension length difference between the original extensions maintained in the storage location OLD_EXTENSIONS 44 and the new modified extensions maintained in the storage location NEW_EXTENSIONS 46 and stores the CRL extension length difference in a storage location EXTENSIONS_LENGTH_DELTA 48.

The computing device 28 continues to process the first CRL stream 34 and identifies the TLV data 20-13 that identifies the signing algorithm used to digitally sign the modified CRL. The computing device 28 stores the TLV data 20-13 in a storage location SIGNING_ALGORITHM 50. A signing algorithm includes a hasher function that hashes the appropriate content of the modified CRL to generate a hash value, and a signer function that then encrypts the hash value with a private key. The computing device 28, based on the TLV data 20-13, identifies the appropriate hasher function and signer function for subsequently generating a digital signature for the modified CRL.

The computing device 28 continues to process the first CRL stream 34 and identifies the TLV data 20-14 that identifies the digital signature of the CRL 12. The computing device 28 determines the length of the digital signature and stores the length in a storage location OLD_SIGNATURE_LENGTH 52. This completes the first pass through the CRL 12.

Figure 4:
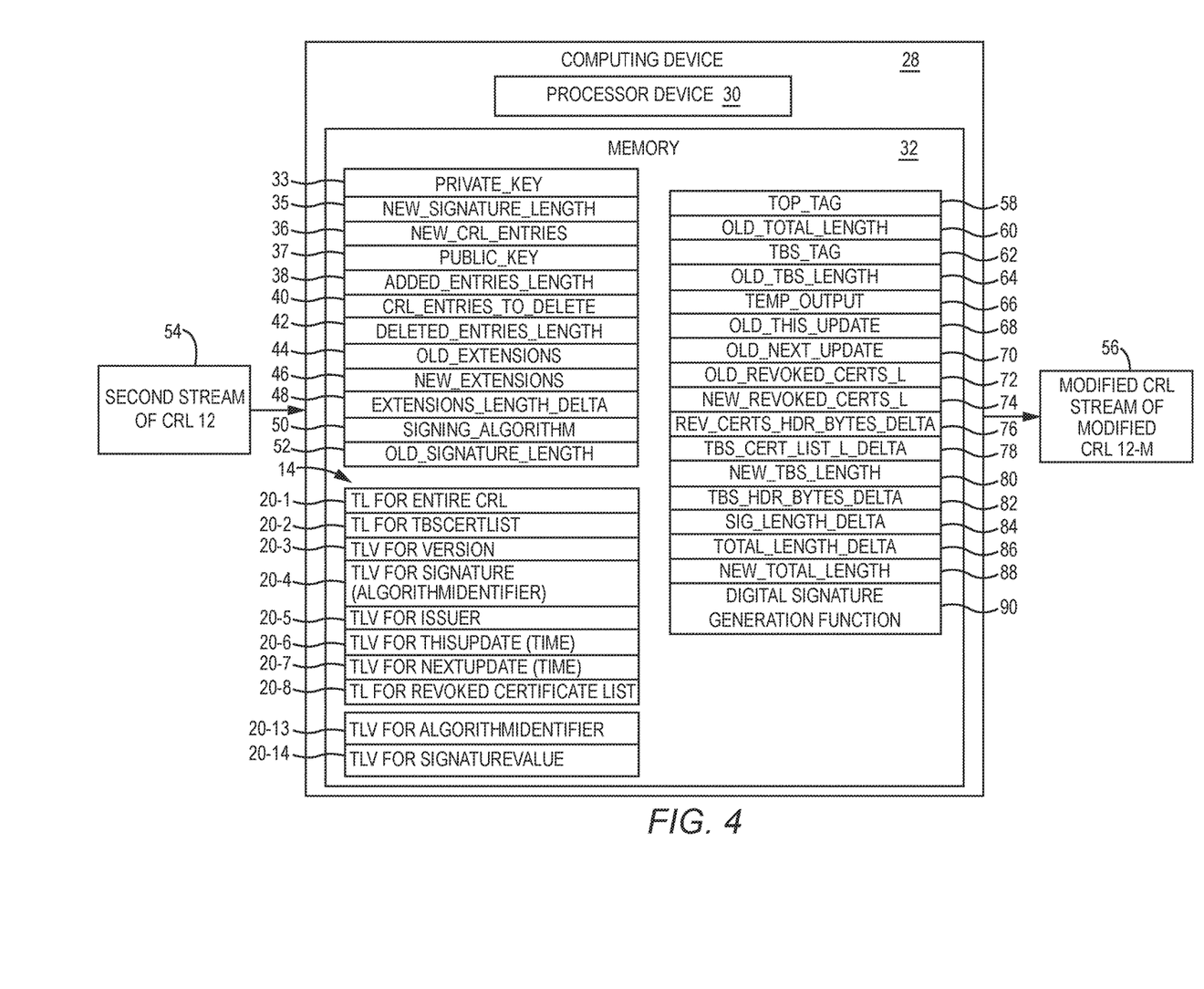
FIG. 4 is a block diagram illustrating aspects of a second pass through the CRL according to one example.

FIG. 4 is a block diagram illustrating aspects of the second pass through the CRL 12 as illustrated in block 1004 of FIG. 2 in greater detail according to one example. The computing device 28 begins processing a second CRL stream 54 that comprises the CRL 12. As discussed above with regard to the first CRL stream 34, the second CRL stream 54 may originate from a CRL file on a storage device, or may be provided to the computing device 28 by a downstream process. The computing device 28, through the processes described in detail herein, generates a modified CRL stream 56 that comprises a modified CRL 12-M. The modified CRL 12-M reflects the CRL 12 with the modifications identified in the desired modifications 24. The computing device 28 generates the modified CRL 12-M by iteratively streaming data to the modified CRL stream 56. The iteratively streamed data cumulatively forms the modified CRL 12-M in a same encoding format as illustrated in FIG. 1. The modified CRL stream 56 may be directed to a file in a storage device, or may be provided to another process for further processing.

For purposes of illustration, FIG. 4 illustrates the encoded header portion 14 of the CRL 12 in the memory 32. The computing device 28 reads the TL data 20-1 from the encoded header portion 14 and stores the tag value in a storage location TOP_TAG 58 and the length value in a storage location OLD_TOTAL_LENGTH 60. The computing device 28 reads the TL data 20-2 from the encoded header portion 14 and stores the tag value in a storage location TBS_TAG 62 and stores the length value in a storage location OLD_TBS_LENGTH 64. The computing device 28 then continues to process the remaining portion of the encoded header portion 14, searching for a tag with a tag type of GeneralizedTime or UTCTime. The computing device 28 stores the encountered TLV data elements of the encoded header portion 14 into a storage location TEMP_OUTPUT 66. Once a tag of the tag type of GeneralizedTime or UTCTime is encountered, this corresponds to the TLV data 20-6, which identifies a time of a current update of the CRL 12. The value of the TLV data 20-6 is stored in a storage location OLD_THIS_UPDATE 68. The computing device 28 then generates a current time in the appropriate format and encodes the current time in DER ASN.1 format to generate new TLV data 20-6. The computing device 28 appends the new TLV data 20-6 to the data in the storage location TEMP_OUTPUT 66.

If the next tag type in the CRL 12 is a tag type of GeneralizedTime or UTCTime, then the CRL 12 contains optional TLV data 20-7 that identifies a next update time. The computing device 28 appends the tag value of the TLV data 20-7 to the data in the storage location TEMP_OUTPUT 66. The computing device 28 generates a new time that identifies a next time to update the CRL 12. In one example, the computing device 28 sets the next update time to the current time plus the difference between the OLD_THIS_UPDATE time identified in the TLV data 20-6 and the OLD_NEXT_UPDATE time identified in the TLV data 20-7. The computing device 28 initially appends the tag of the TLV data 20-7 to the data in the storage location TEMP_OUTPUT 66. The computing device 28 stores the time identified in the TLV data 20-7 in a storage location OLD_NEXT_UPDATE 70. The computing device 28 computes the time difference between the time in the storage location OLD_THIS_UPDATE 68 and the time in the storage location OLD_NEXT_UPDATE 70. The time difference is added to the current time. The resulting time is encoded in the DER ASN.1 format and appended to the data in the storage location TEMP_OUTPUT 66.

The computing device 28 next reads the TL data 20-8 of the encoded CRL entries portion 16 of the CRL 12. The computing device 28 appends the tag to the data in the storage location TEMP_OUTPUT 66. The computing device 28 stores the length of the TL data 20-8 in a storage location OLD_REVOKED_CERTS_L 72. The computing device 28 is now at the first CRL entry 22-1 in the encoded CRL entries portion 16. The computing device 28 now adjusts lengths of the encoded header portion 14 prior to streaming a modified encoded header portion to the modified CRL stream 56.

The computing device 28 determines a length value for the TL data 20-8 and stores the length value in a storage location NEW_REVOKED_CERTS_L 74 in accordance with the following formula:

NEW_REVOKED_CERTS_$L$ 74:=OLD_REVOKED_CERTS_$L$ 72+(ADDED_ENTRIES_LENGTH 38−DELETED_ENTRIES_LENGTH 42)

The computing device 28 determines whether the number of bytes needed to encode the length value in NEW_REVOKED_CERTS_L 74 differs from the number of bytes needed to encode the length value in OLD_REVOKED_CERTS_L 72 and stores the difference in a storage location REV_CERTS_HDR_BYTES_DELTA 76. The computing device 28 determines a difference between a new length of the TL data 20-2 and the original length of the TL data 20-2 and stores the difference in a storage location TBS_CERT_LIST_L_DELTA 78 in accordance with the following formula:

TBS_CERT_LIST_$L$_DELTA 78:=ADDED_ENTRIES_LENGTH 38−DELETED_ENTRIES_LENGTH 42+REV_CERTS_HDR_BYTES_DELTA 76+EXTENSIONS_LENGTH_DELTA 48.

The computing device 28 determines a new length value for the TL data 20-2 and stores the new length value in a storage location NEW_TBS_LENGTH 80 in accordance with the following formula:

NEW_TBS_LENGTH 80:=OLD_TBS_LENGTH 64+TBS_CERT_LIST_$L$_DELTA 78.

The computing device 28 determines whether the number of bytes needed to encode the length value in NEW_TBS_LENGTH 80 differs from the number of bytes needed to encode the length value in OLD_TBS_LENGTH 64 and stores the difference in a storage location TBS_HDR_BYTES_DELTA 82.

The computing device 28 determines a difference in length of the old digital signature and the new digital signature and stores the difference in a storage location SIG_LENGTH_DELTA 84 in accordance with the following formula:

SIG_LENGTH_DELTA 84:=NEW_SIGNATURE_LENGTH 35−OLD_SIGNATURE_LENGTH 52.

The computing device 28 determines a total difference in length of the CRL 12 and the modified CRL 12-M and stores the total difference in length in a storage location TOTAL_LENGTH_DELTA 86 in accordance with the following formula:

TOTAL_LENGTH_DELTA 86:=TBS_CERT_LIST_$L$_DELTA 78+TBS_HDR_BYTES_DELTA 82+SIG_LENGTH_DELTA 84.

The computing device 28 determines a new total length for the TL value 20-1 and stores the new total length in a storage location NEW_TOTAL_LENGTH 88 in accordance with the following formula:

NEW_TOTAL_LENGTH 88:=OLD_TOTAL_LENGTH 60+TOTAL_LENGTH_DELTA 86.

The computing device 28 now begins to stream the encoded header portion 14 of the modified CRL 12-M to the modified CRL stream 56. The computing device 28 streams the data in the storage location TOP_TAG 58 to the modified CRL stream 56. This data is the tag value in the TL data 20-1. The computing device 28 encodes the value of the storage location NEW_TOTAL_LENGTH 88 and streams the encoded value to the modified CRL stream 56. The computing device 28 streams the data in the storage location TBS_TAG 62 to the modified CRL stream 56.

The computing device 28 also includes a digital signature generation function 90 that generates a digital signature for the CRL 12-M. The digital signature generation function 90 includes a hasher function that hashes the appropriate content of the modified CRL 12-M to generate a hash value, and a signer function that then encrypts the hash value with the private key stored in the storage location PRIVATE_KEY 33. The particular digital signature generation function 90 utilized is based on the TLV data 20-13 stored in the storage location SIGNING_ALGORITHM 50. The digital signature of the CRL 12-M is based on the contents of the TL data 20-2 and the value of the TL data 20-2 which includes the TLVs 20-3-20-12. Thus, the computing device 28 also sends the data in the storage location TBS_TAG 62 to the digital signature generation function 90 for use in generating a digital signature.

The computing device 28 encodes the value of the storage location NEW_TBS_LENGTH 80 and streams the encoded value to the modified CRL stream 56, and sends the encoded value to the digital signature generation function 90. The computing device 28 streams the contents of the storage location TEMP_OUTPUT 66 to the modified CRL stream 56, and sends the contents of the storage location TEMP_OUTPUT 66 to the digital signature generation function 90.

The computing device 28 now iteratively processes each CRL entry 22 in the encoded CRL entries portion 16 in the following manner. The computing device 28 determines the total length of the current CRL entry 22. The computing device 28 decrements the value in the storage location OLD_REVOKED_CERTS_L 72. The computing device 28 makes a determination whether the CRL entry 22 should be deleted by determining if the certificate serial number of the CRL entry 22 matches a certificate serial number 26 in the storage location CRL_ENTRIES_TO_DELETE 40. If the certificate serial number of the CRL entry 22 matches a certificate serial number 26 in the storage location CRL_ENTRIES_TO_DELETE 40, the computing device 28 reads the next CRL entry 22. If the CRL entry 22 does not match a certificate serial number 26 in the storage location CRL_ENTRIES_TO_DELETE 40, the computing device 28 streams the CRL entry 22 to the modified CRL stream 56, and sends the CRL entry 22 to the digital signature generation function 90. The computing device 28 does not generate an in-memory data structure of each CRL entry 22. In some examples, the computing device 28 reuses the same memory location for each CRL entry 22 such that only one CRL entry 22 remains in the memory 32 at one time.

When the value in the OLD_REVOKED_CERTS_L 72 reaches zero, each CRL entry 22 has been processed. The computing device 28 streams the data in the storage location NEW_CRL_ENTRIES 36 to the modified CRL stream 56, and sends the data in the storage location NEW_CRL_ENTRIES 36 to the digital signature generation function 90. The computing device 28 then streams the data in the storage location NEW_EXTENSIONS 46 to the modified CRL stream 56, and sends the data in the storage location NEW_EXTENSIONS 46 to the digital signature generation function 90. The data in the storage location NEW_EXTENSIONS 46 is the final data that makes up part of the digital signature.

The computing device 28 streams the data in the storage location SIGNING_ALGORITHM 50 to the modified CRL stream 56. The data in the storage location SIGNING_ALGORITHM 50 comprises the TLV data 20-13. The computing device 28 requests that the digital signature generation function 90 generate a digital signature, encode the digital signature, and stream the encoded digital signature data to the modified CRL stream 56. The encoded digital signature comprises the TLV data 20-14.

The encoded digital signature constitutes the last portion of the modified CRL 12-M. The computing device 28 may close the modified CRL stream 56. In some examples, the modified CRL stream 56 may be directed to a storage device, and the modified CRL 12-M is sent to a file stored on the storage device. Notably, the computing device 28 modifies the CRL 12 with the desired modifications 24 without building an in-memory data structure that contains each CRL entry 22. Moreover, during the processing of each CRL entry 22, it is not necessary to re-encode each CRL entry 22 in the DER ASN.1 format because each CRL entry 22 is read in the DER ASN.1 format, and if the CRL entry 22 is not deleted, it is simply streamed to the modified CRL stream 56 in the encoding format.

While the examples herein have been illustrated in the context of modifying the CRL 12, the examples may also be used to efficiently read a CRL 12 to determine if a certificate has been revoked.

Figure 5:
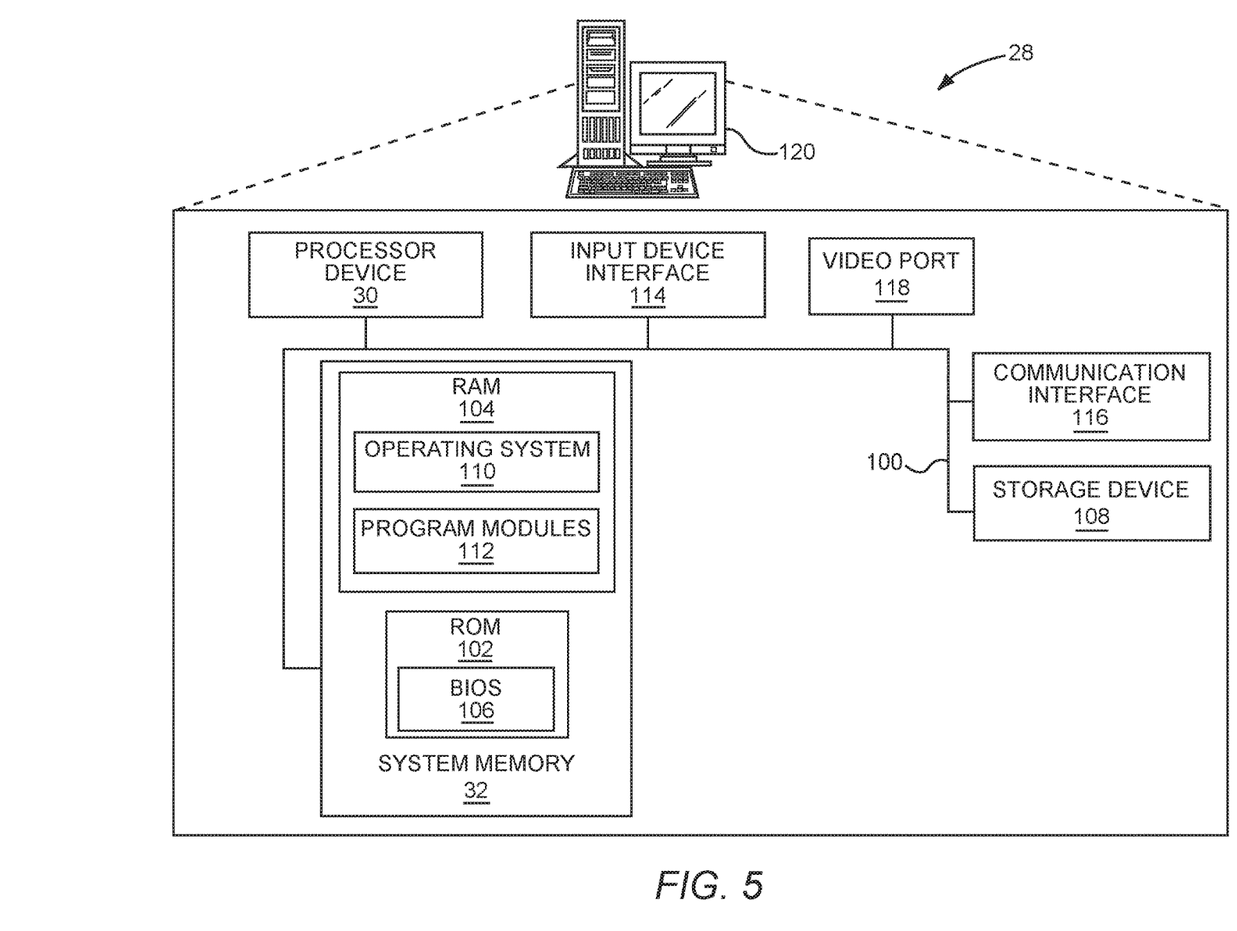
FIG. 5 is a block diagram illustrating a computing device suitable for implementing examples herein, according to one example.

FIG. 5 is a block diagram of the computing device 28 suitable for implementing examples according to one example. The computing device 28 may comprise any computing or electronic device capable of including firmware, hardware, and/or executing software instructions to implement the functionality described herein, such as a computer server, a desktop computing device, a laptop computing device, or the like. The computing device 28 includes the processor device 30, the system memory 32, and a system bus 100. The system bus 100 provides an interface for system components including, but not limited to, the system memory 32 and the processor device 30. The processor device 30 can be any commercially available or proprietary processor.

The system bus 100 may be any of several types of bus structures that may further interconnect to a memory bus (with or without a memory controller), a peripheral bus, and/or a local bus using any of a variety of commercially available bus architectures. The system memory 32 may include non-volatile memory 102 (e.g., read-only memory (ROM), erasable programmable read-only memory (EPROM), electrically erasable programmable read-only memory (EEPROM), etc.), and/or volatile memory 104 (e.g., random-access memory (RAM)). A basic input/output system (BIOS) 106 may be stored in the non-volatile memory 102 and can include the basic routines that help to transfer information between elements within the computing device 28. The volatile memory 104 may also include a high-speed RAM, such as static RAM, for caching data.

The computing device 28 may further include or be coupled to a non-transitory computer-readable storage medium or device 108, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 108 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 108 and in the volatile memory 104, including an operating system 110 and one or more program modules 112, which may implement the functionality described herein in whole or in part, including, for example, the determination of a desired modification to a CRL encoded in an encoding format, sequentially processing, during the first pass, the first CRL stream comprising the CRL, and sequentially processing, during the second pass, the second CRL stream, and the like. It is to be appreciated that the examples can be implemented with various commercially available operating systems 110 or combinations of operating systems 110.

All or a portion of the examples may be implemented as a computer program product stored on a transitory or non-transitory computer-usable or computer-readable storage medium, such as the storage device 108, which includes complex programming instructions, such as complex computer-readable program code, configured to cause the processor device 30 to carry out the steps described herein. Thus, the computer-readable program code can comprise software instructions for implementing the functionality of the examples described herein when executed on the processor device 30. The processor device 30, in conjunction with the program modules 112 in the volatile memory 104, may serve as a controller, or control system, for the computing device 28 that is configured to, or adapted to, implement the functionality described herein.

An operator or other user may also be able to enter one or more configuration commands through a keyboard (not illustrated), a pointing device such as a mouse (not illustrated), or a touch-sensitive surface (not illustrated). Such input devices may be connected to the processor device 30 through an input device interface 114 that is coupled to the system bus 100 but can be connected by other interfaces such as a parallel port, an Institute of Electrical and Electronic Engineers (IEEE) 1394 serial port, a Universal Serial Bus (USB) port, an IR interface, and the like.

The computing device 28 may also include a communication interface 116 suitable for communicating with a network as appropriate or desired. The computing device 28 may also include a video port 118 configured to interface with a display 120, to provide the operator or user information during the examples disclosed herein.

Individuals will recognize improvements and modifications to the examples of the disclosure. All such improvements and modifications are considered within the scope of the concepts disclosed herein and the claims that follow.

What is claimed is:

1. A method for modifying a certificate revocation list (CRL) comprising:
    determining a desired modification to a CRL encoded in an encoding format, the CRL comprising an encoded header portion, an encoded CRL entries portion, and an encoded trailer portion;
    sequentially processing, by a computing device comprising a processor device, during a first pass, a first CRL stream comprising the CRL to identify a CRL length difference between the CRL and a modified CRL based on the desired modification;
    sequentially processing, by the computing device, during a second pass, a second CRL stream comprising the CRL; and
        streaming a modified encoded header portion to a modified CRL stream that identifies a new length of the modified CRL based on the CRL length difference;
        streaming a modified encoded CRL entries portion comprising a plurality of CRL entries to the modified CRL stream that contains the desired modification; and
        streaming a modified encoded trailer portion to the modified CRL stream that contains a new digital signature based on the desired modification.

2. The method of claim 1 wherein determining the desired modification to the CRL comprises receiving data identifying the plurality of CRL entries to be added to the CRL.

3. The method of claim 1 wherein determining the desired modification to the CRL comprises receiving data identifying the plurality of CRL entries to be removed from the CRL.

4. The method of claim 1 wherein determining the desired modification to the CRL comprises:
    during the first pass, iteratively analyzing each CRL entry of the plurality of CRL entries based on predetermined criteria; and
    identifying each CRL entry that matches the predetermined criteria as a CRL entry to delete during the second pass.

5. The method of claim 4 wherein during the first pass, iteratively analyzing each CRL entry based on the predetermined criteria further comprises:
    during the first pass, iteratively analyzing each CRL entry to determine if the CRL entry identifies a certificate that has expired; and
    if the CRL entry identifies the certificate that has expired, identifying the CRL entry as a CRL entry to delete during the second pass.

6. The method of claim 1 wherein sequentially processing, during the first pass, the first CRL stream comprising the CRL to identify the CRL length difference between the CRL and the modified CRL based on the desired modification further comprises:
    determining a CRL entry length difference based on a total length of all CRL entries to be deleted during the second pass and a total length of all CRL entries to be added during the second pass;
    determining a CRL extension length difference between the CRL and the modified CRL;
    determining a CRL signature length difference between the CRL and the modified CRL; and
    determining the CRL length difference based on the CRL entry length difference, the CRL extension length difference, and the CRL signature length difference.

7. The method of claim 1 wherein streaming the modified encoded header portion to the modified CRL stream that identifies the new length of the modified CRL based on the length difference further comprises:
    generating the modified encoded header portion by:
        analyzing the encoded header portion to identify a CRL length value that identifies a total length of the CRL;
        modifying the CRL length value based on the length difference;
        analyzing the encoded header portion to identify a CRL length value that identifies a total length of the CRL entries portion; and
        modifying the CRL length value based on a determined length of the CRL entries portion that has been modified in accordance with the desired modification.

8. The method of claim 1 wherein streaming the modified encoded CRL entries portion comprising the plurality of CRL entries to the modified CRL stream that contains the desired modification further comprises:
    iteratively reading a CRL entry from the CRL stream, making a determination whether the CRL entry is to be deleted, and streaming the CRL entry to the modified CRL stream unless the CRL entry is to be deleted until all CRL entries have been read from the CRL stream;
    encoding a plurality of new CRL entries into the encoding format; and
    streaming the plurality of new CRL entries to the modified CRL stream.

9. The method of claim 8 wherein memory associated with each CRL entry read from the CRL stream is reused for reading a next CRL entry such that only one CRL entry remains in the memory at one time.

10. The method of claim 1 wherein streaming the modified encoded trailer portion to the modified CRL stream that contains the new digital signature based on the desired modification further comprises:
generating the new digital signature based on the modified encoded CRL entries portion;
encoding the new digital signature in the encoding format to generate an encoded digital signature; and
streaming the encoded digital signature to the modified CRL stream.

11. The method of claim 1 wherein the modified CRL stream is stored in a file in a storage device.

12. A computing device, comprising:
a memory;
a processor device coupled to the memory to:
determine a desired modification to a certificate revocation list (CRL) encoded in an encoding format, the CRL comprising an encoded header portion, an encoded CRL entries portion, and an encoded trailer portion;
sequentially process, during a first pass, a first CRL stream comprising the CRL to identify a CRL length difference between the CRL and a modified CRL based on the desired modification;
sequentially process, during a second pass, a second CRL stream comprising the CRL and:
stream a modified encoded header portion to a modified CRL stream that identifies a new length of the modified CRL based on the CRL length difference;
stream a modified encoded CRL entries portion comprising a plurality of CRL entries to the modified CRL stream that contains the desired modification; and
stream a modified encoded trailer portion to the modified CRL stream that contains a new digital signature based on the desired modification.

13. The computing device of claim 12 wherein to determine the desired modification to the CRL the processor device is further to receive data identifying a plurality of CRL entries to be added to the CRL.

14. The computing device of claim 12 wherein to determine the desired modification to the CRL the processor device is further to receive data identifying a plurality of CRL entries to be removed from the CRL.

15. The computing device of claim 12 wherein to sequentially process, during the first pass, the first CRL stream comprising the CRL to identify the CRL length difference between the CRL and the modified CRL based on the desired modification, the processor device is further to:
determine a CRL entry length difference based on a total length of all CRL entries to be deleted during the second pass and a total length of all CRL entries to be added during the second pass;
determine a CRL extension length difference between the CRL and the modified CRL;
determine a CRL signature length difference between the CRL and the modified CRL; and
determine the CRL length difference based on the CRL entry length difference, the CRL extension length difference, and the CRL signature length difference.

16. The computing device of claim 12 wherein to stream the modified encoded CRL entries portion comprising the plurality of CRL entries to the modified CRL stream that contains the desired modification, the processor device is further to:
iteratively read a CRL entry from the CRL stream;
make a determination whether the CRL entry is to be deleted;
stream the CRL entry to the modified CRL stream, unless the CRL entry is to be deleted, until all CRL entries have been read from the CRL stream;
encode a plurality of new CRL entries into the encoding format; and
stream the plurality of new CRL entries to the modified CRL stream.

17. The computing device of claim 16 wherein memory associated with each CRL entry read from the CRL stream is reused for reading a next CRL entry such that only one CRL entry remains in the memory at one time.

18. The computing device of claim 12 wherein to stream the modified encoded trailer portion to the modified CRL stream that contains the new digital signature based on the desired modification, the processor device is further to:
generate the new digital signature based on the modified encoded CRL entries portion;
encode the new digital signature in the encoding format to generate an encoded digital signature; and
stream the encoded digital signature to the modified CRL stream.

19. A computer program product for modifying a certificate revocation list (CRL), the computer program product stored on a non-transitory computer-readable storage medium and including instructions configured to cause a processor device to carry out steps of:
determining a desired modification to the CRL encoded in an encoding format, the CRL comprising an encoded header portion, an encoded CRL entries portion, and an encoded trailer portion;
sequentially processing during a first pass, a first CRL stream comprising the CRL to identify a CRL length difference between the CRL and a modified CRL based on the desired modification;
sequentially processing during a second pass, a second CRL stream comprising the CRL and:
streaming a modified encoded header portion to a modified CRL stream that identifies a new length of the modified CRL based on the CRL length difference;
streaming a modified encoded CRL entries portion comprising a plurality of CRL entries to the modified CRL stream that contains the desired modification; and
streaming a modified encoded trailer portion to the modified CRL stream that contains a new digital signature based on the desired modification.

* * * * *